United States Patent
Moreira Da Silva et al.

(10) Patent No.: US 12,286,869 B2
(45) Date of Patent: Apr. 29, 2025

(54) METHOD FOR EXPANDING THE CAPACITY FOR LOCAL STORAGE OF CHEMICAL PRODUCTS OR THEIR SOLUTIONS IN RESERVOIR ROCK

(71) Applicant: PETRÓLEO BRASILEIRO S.A.-PETROBRAS, Rio de Janeiro (BR)

(72) Inventors: Fernando Antonio Moreira Da Silva, Rio de Janeiro (BR); Mario Germino Ferreira Da Silva, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 0 days.

(21) Appl. No.: 18/504,935

(22) Filed: Nov. 8, 2023

(65) Prior Publication Data

US 2024/0151124 A1    May 9, 2024

(30) Foreign Application Priority Data

Nov. 9, 2022    (BR) ............................ 1020220228604

(51) Int. Cl.
*E21B 43/017*    (2006.01)
*C09K 8/584*    (2006.01)
*E21B 43/16*    (2006.01)

(52) U.S. Cl.
CPC ............ *E21B 43/166* (2013.01); *C09K 8/584* (2013.01); *E21B 43/017* (2013.01)

(58) Field of Classification Search
CPC ............................ E21B 41/0007; E21B 43/16
See application file for complete search history.

(56) References Cited

U.S. PATENT DOCUMENTS

| | | | |
|---|---|---|---|
| 10,570,715 B2 | 2/2020 | Babcock et al. | |
| 2012/0261117 A1* | 10/2012 | Pavia | C09K 8/582 166/246 |
| 2015/0060075 A1 | 3/2015 | Blom et al. | |
| 2017/0210973 A1* | 7/2017 | Agrawal | C09K 8/032 |
| 2021/0371726 A1* | 12/2021 | Kanj | E21B 43/162 |
| 2022/0042403 A1* | 2/2022 | Gould | E21B 43/25 |
| 2023/0183549 A1* | 6/2023 | Swanson | E21B 43/16 166/270.1 |
| 2024/0068332 A1* | 2/2024 | Haukelidsæter Eidesen et al. ..... E21B 43/0107 |

FOREIGN PATENT DOCUMENTS

CA    2147079 C    10/2006

* cited by examiner

*Primary Examiner* — Robert E Fuller
*Assistant Examiner* — Lamia Quaim
(74) *Attorney, Agent, or Firm* — Troutman Pepper Locke LLP

(57) ABSTRACT

The present invention relates to a method for storing chemical products or their solutions in reservoir rock. In said method, the cargo boat containing the chemical product to be stored in the reservoir is connected to the production platform through an appropriate connection and connecting to the well header. The product is pumped through the chemical product capture line using a triplex chemical injection pump aligned to the head of the production or injection well. The product is pumped through the surface lines, riser and subsea line and, passing through the WCT, it is injected into the reservoir through the production or injection string.

11 Claims, 6 Drawing Sheets

METHOD FOR EXPANDING THE CAPACITY FOR LOCAL STORAGE OF CHEMICAL PRODUCTS OR THEIR SOLUTIONS IN RESERVOIR ROCK

CROSS REFERENCE TO RELATED APPLICATION

The application claims, under 35 U.S.C. 119(a), priority to and the benefit of Brazilian Patent Application No. BR 10 2022 022860 4, filed Nov. 9, 2022, which is incorporated by reference herein in its entirety.

FIELD OF THE INVENTION

The present invention pertains to the field of oil recovery, more precisely in the field of product storage, and refers to a method for storing chemical products or their solutions in reservoir rock.

BACKGROUNDS OF THE INVENTION

Currently, chemical treatments to be carried out remotely had limited capacity of storing chemical products, whether in operations at the maritime unit itself or with WSSV (well stimulation submarine vessel) type vessels. With the need of using volumes of chemical products above the storage capacity of the maritime platforms, it was necessary to develop a method to expand the capacity thereof and thus of treatment. This is mainly motivated by actions aimed at increasing oil recovery (e.g., RES20) when using improved recovery methods that adopt the use of high treatment volumetries. The method will allow the necessary treatment volumes to be expanded by storing the product in the reservoir rock itself. This will make it possible to increase the recovery factor (EOR) in reservoir technology, or chemical treatments to guarantee flow.

In previous interventions, the volumetry was limited by the receiving and storage capacity of the operational unit caused by: design limitations in relation to the storage area for chemical products, lack of sufficient tankage for high consumption products and limited crane capacity. There would be a need to hire extra service vessels to store the volume of product.

Furthermore, considering that current pre-salt marine installation designs allow the conversion of producing wells into injection wells or vice versa, it was decided to take advantage of this capacity to carry out the possible storage of stable chemical products by injection into production or injection wells that may be deactivated or still temporarily available. The method will allow to increase the local storage capacity of chemical products in the reservoir rock itself, enabling the use of large quantities of product applied in improved oil recovery to increase the recovery factor (EOR) in reservoir technology, or chemical treatments to guarantee flow.

STATE OF THE ART

Document U.S. Ser. No. 10/570,715B2 describes a method of enhanced oil recovery from an unconventional resource reservoir comprising injecting an enhanced recovery fluid into the unconventional resource reservoir, by means of an injection well, and producing hydrocarbons from the unconventional resource reservoir by means of the injection well or a production well displaced from the injection well.

Document US20150060075A1 refers to a method for improving oil recovery from a formation. An enhanced oil recovery formulation, comprising a gas composed of a hydrocarbon-containing gas and an ether having 2 to 4 carbons, is injected into an oil-containing formation to mobilize the oil. The mobilized oil is then produced from the formation.

Document CA2147079C describes a method for recovering hydrocarbons from a hydrocarbon reservoir including injecting a hydrocarbon solvent into the reservoir together with a displacement gas to mobilize hydrocarbons in the hydrocarbon reservoir; and production of hydrocarbons mobilized from the hydrocarbon reservoir. The hydrocarbon solvent is injected along one or more predominantly horizontal injection wells in the aquifer, which are spaced from the production well or wells. The hydrocarbon solvent is a hydrocarbon solvent selected from the group consisting of ethane, propane, butane. The apparatus for recovering hydrocarbons from a hydrocarbon reservoir includes at least a first and preferably several injection wells drilled into the reservoir, the injection wells having an open portion for fluid communication with the reservoir; and at least one first production well and preferably several production wells drilled into the reservoir and spaced below the injection wells, the first production well including a pump for pumping oil from the well. A solvent recovery system is also preferably connected between adjacent injection wells and production wells.

Despite the finding that numerous procedures have been developed in order to circumvent the need to use volumes of chemical products above the storage capacity of maritime platforms, it is observed that the solutions found are generally based on holistic processes, that is, an analysis is carried out from the origin of the problem to the impacts it may cause and, from there, a readaptation/readjustment of existing facilities is proposed. In this way, it is ascertained that, in the present invention, the procedure used aims at solving obstacles/setbacks that may appear during autonomous chemical treatment, in this case, the need to increase the storage capacity of chemical products more efficiently, whereas in the mentioned documents of prior art, the found solutions are different and in accordance with the found needs.

SUMMARY OF THE INVENTION

The present invention aims at proposing a method for storing chemical products or their solutions in reservoir rock. In said method, the cargo boat containing the chemical product to be stored in the reservoir is connected to the production platform through an appropriate connection and connecting to the well header. The product is pumped through the chemical product capture line using a triplex chemical injection pump aligned to the head of the production or injection well. The product is pumped through the surface lines, riser and subsea line and, passing through the WCT, it is injected into the reservoir through the production or injection string.

DETAILED DESCRIPTION OF THE INVENTION

Figure 1:
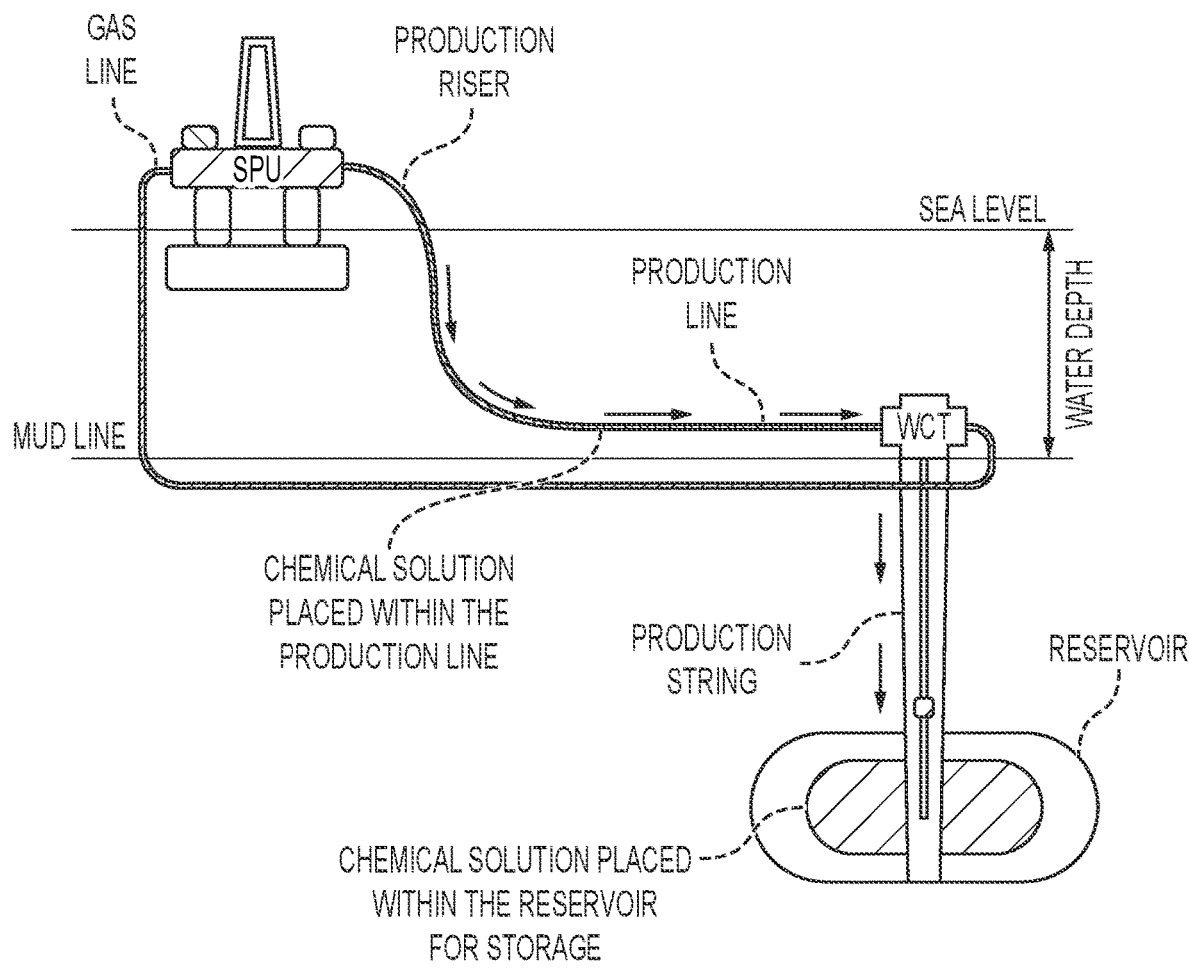
FIG. 1 presents the injection of the product into the storage well.

The present invention relates to a method for storing chemical products or their solutions in reservoir rock comprising the following steps:
- (a) assessment of the compatibility of the chemical product to be stored with the selected reservoir: sandstone or carbonate;
- (b) selection of the product volumetry, which must be between 500 and 1000 bbl (79.49 and 158.99 m$^3$), preferably between 600 and 800 bbl (95.39 and 127.19 m$^3$);
- (c) sending the chemical product, through the transfer line (2) by the cargo vessel (1), which will undergo an adaptation in the production and/or injection header (4) of the SPU (3);
- (d) optional positioning of the product in a temporary storage tank present in the SPU (3), buffer tank;
- (e) pressurizing and sending, through the injection skid (5), the product to the wellhead (6) which passes to the subsea line (7), and injection into the reservoir (8).

The pumping pressure will be defined based on the static pressure of each reservoir, which must at least not be less than 300 psi (2.068 MPa). According to the equation below:

$$PH = 0.1704 \times D \times TVD \qquad \text{Equation 1:}$$

Where:
D=fluid weight (density), 8.55 lbm/gal (1.0245 g/cm$^3$)—sea water and 8.33 lbm/gal (0.99815 g/cm$^3$)—industrial water
PH=hydrostatic pressure
TVD=vertical depth in meters
- (f) penetration of the product into the reservoir rock (10), through the injection or production string (9), where it will be stored for later use;
- (g) removal of the chemical product from the reservoir, aligning its production to another well, where the treatment will be carried out.

The production alignment will be carried out by connecting, through lines of the subsea production system, the well with the chemical product stored with the well that will be treated; in this case, a subsea manifold is used. Alternatively, when there is no manifold, the well with the stored chemical product will be aligned to the platform and from there to the well that will receive the treatment. It is worth noting that the use of the manifold makes the operation simpler, as it is not necessary to go through the stationary production unit.

The chemical product will be pumped from its container (tank) in alignment with a production or injection well and stored in the reservoir condition. When product availability is necessary, the containment well will be put into production to recover the product in at least two alternatives:
- aligned for mixing in the production header for injection into the treatment target well;
- aligned for mixing in the production or injection header, for direct injection into the treatment target well.

One of the similar examples are squeeze treatments, in which a partial storage of the inhibitor occurs by adsorption on the surface of the treated rock, allowing for the action of the scale inhibitor for the time necessary until a new treatment is carried out. The maximum treatment volume that can be carried out in squeeze is 4,000 to 5,000 bbl (635.95 to 794.94 m$^3$), preferably 4,500 bbl (715.44 m$^3$) of aqueous fluid.

The storage capacity of SPUs is typically limited to up to 40 m$^3$ of chemical product, often requiring the use of extra support boats (deck extension) or the use of nearby units to store the product, which makes the process very expensive and sometimes unfeasible. Typical volumes of subsea lines are in the order of 150 m$^3$, which can lead to retreatment with the need for new well shutdowns and consequent new loss of accumulated production.

In TOPSIDE treatment, the volumetry is even more limited as typical tank volumes do not exceed 20 m$^3$. Considering that current pre-salt marine installation projects allow the conversion of production wells into injection wells or vice versa, it was decided to take advantage of this capacity to carry out the possible storage of stable chemical products, by injection in production or injection wells that can be deactivated or still temporarily available. The method will increase the local storage capacity of chemical products, enabling the use of large quantities of product applied in the improved oil recovery to increase the recovery factor. There is still not a large volume of WSSV (well service stimulation vessel) treatments on the stimulation boats, which is the state of the art, and there is also limited storage of chemical products, in the range of 600 to 800 bbl (95.39 to 127.19 m$^3$), on this type of vessel. With the combination of autonomous treatments in SPUs and the storage proposed by the method in reservoirs, it would be possible to equalize the treatment capacity of the stimulation boat, eliminating the use of WSSV even for high volumetries, such as 600 to 800 bbl (95.39 to 127.19 m$^3$). In this way, the operation would be simpler and without volume limitations.

The chemical product must have its compatibility assessed, depending on the rock type (carbonates, siliciclastics, clays, etc.). In this case, an example would be a scale inhibitor validated for Buzios with full compatibility (indefinite contact period) in a 10% solution in a carbonate reservoir, and it would qualify as a product for storage.

The chemical product (scale inhibitor) is selected from sulfonates, carboxylic acids and amides, preferably said inhibitor is selected from the group consisting of pentaphosphonates, phosphinopolycarboxylate, polyvinylsulfonate, sulfonated polyacrylic copolymers, polyacrylates, polyaspartates of α-linkage, polyaspartates of β-linkage and carboxy-methyl-inulin. However, any chemical product compatible with the reservoir rock can be used. Some examples would be: hydrate inhibitors (alcohols, glycols, poly-ethylene glycol, others), surfactants, (silicone- or per-fluorosilicone-based) anti-foaming agents. In other words, it is enough to have compatibility between the reservoir rock and the chemical product.

Examples of the Invention

After evaluating the compatibility of the chemical product to be stored with the selected reservoir, as well as selecting the volumetry of the product, the same was injected into the storage well (FIG. 1). After receiving the product from a cargo vessel, the SPU (stationary production unit) may supply the chemical product to a SPU tank appropriate for this storage. Next, the chemical product will be pumped to a target well by using transfer or injection pumps in the storage well.

Figure 2:
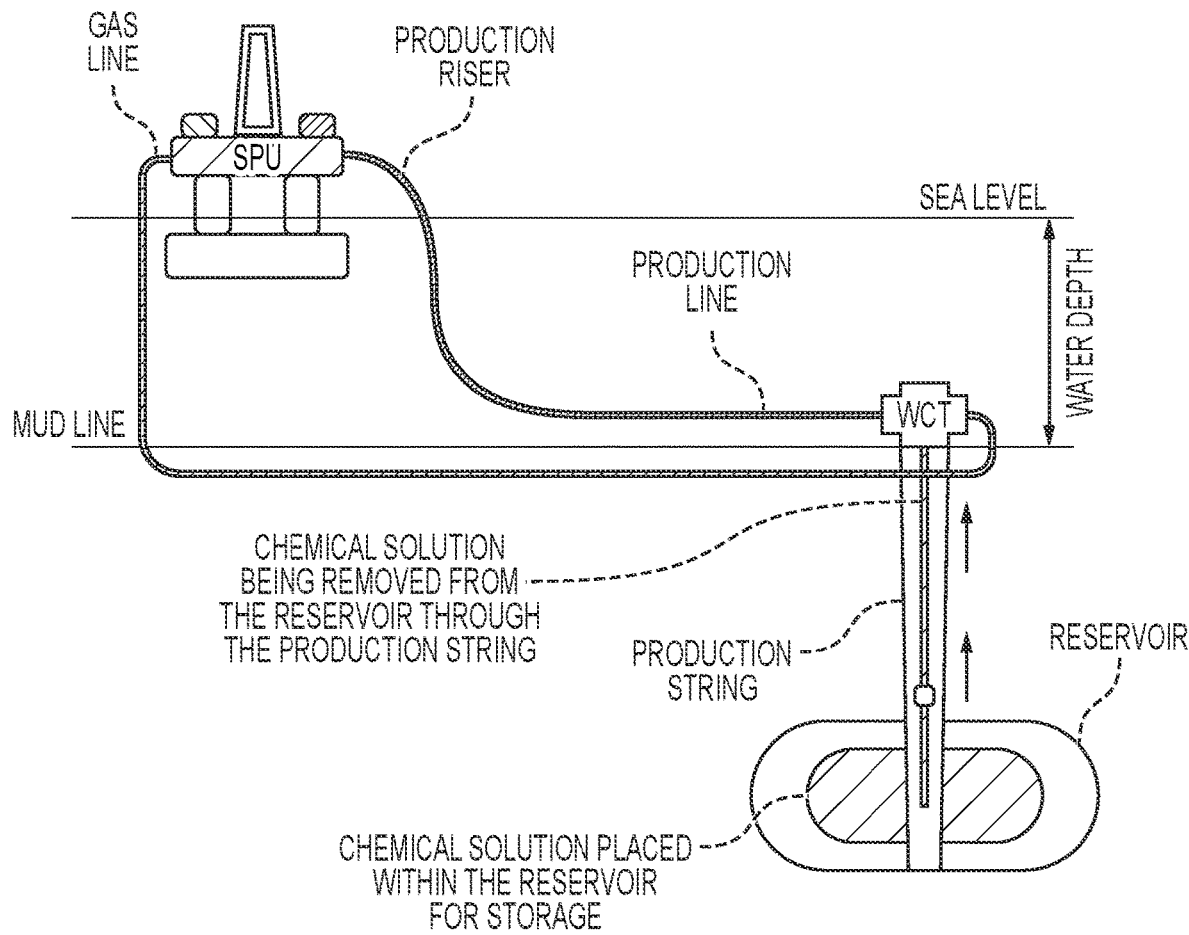
FIG. 2 presents the removal or production of the product from the storage well.

After equalizing the pressure and temperature of the product in the reservoir conditions, the storage well is aligned to the production and/or injection header, and, from the header, the product is pumped through an injection pump to the chemical treatment target well (FIG. 2).

Figure 3:
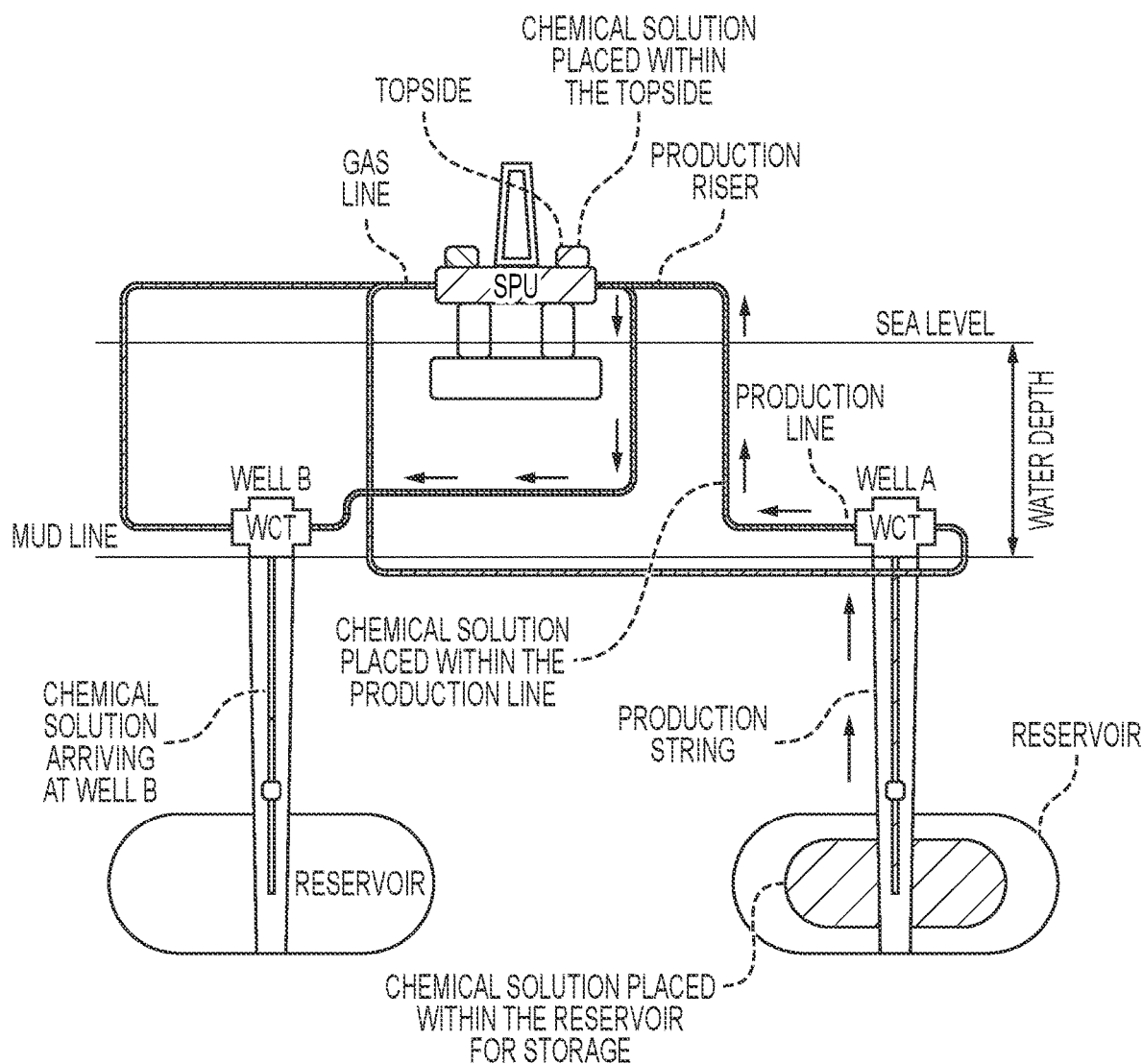
FIG. 3 presents the injection of the product cushion produced into the well to be treated.

The chemical product that was stored in the reservoir is drained through the production string passing through the WCT, following the production line to the production and/or injection header, following the alignment for the injection pump, following the production or injection riser for the WCT from the target well, being injected into the reservoir through the target well string (FIG. 3).

Figure 4:
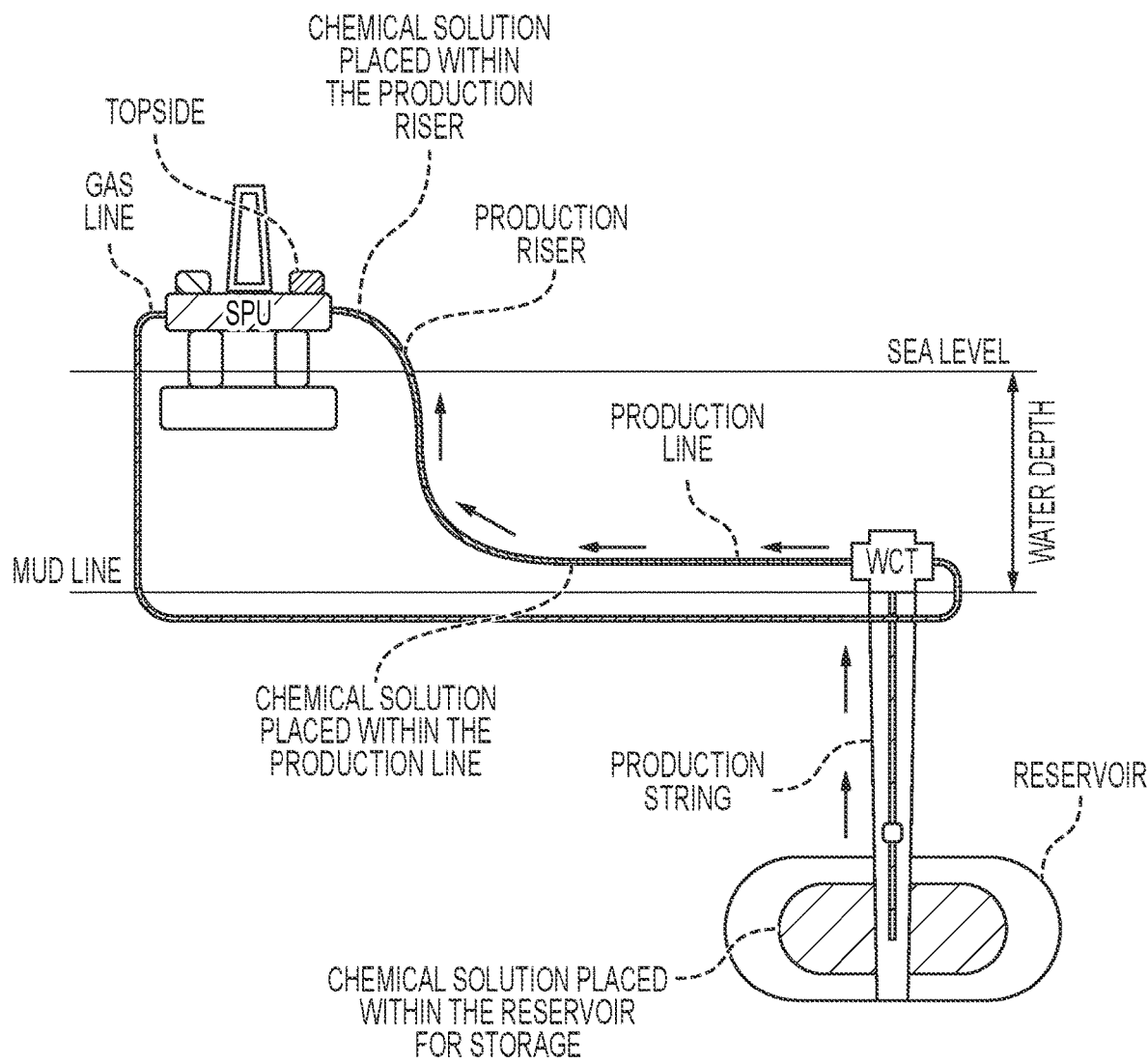
FIG. 4 presents the production of the product for flowline treatment.

For the production of the product for treatment in the production line (flowline) (FIG. 4), after equalizing the pressure and temperature of the product in the reservoir conditions, the storage well is aligned to the production and/or injection header being pumped through the service line of the treatment target well and circulated through the production line to the treatment line.

Figure 5:
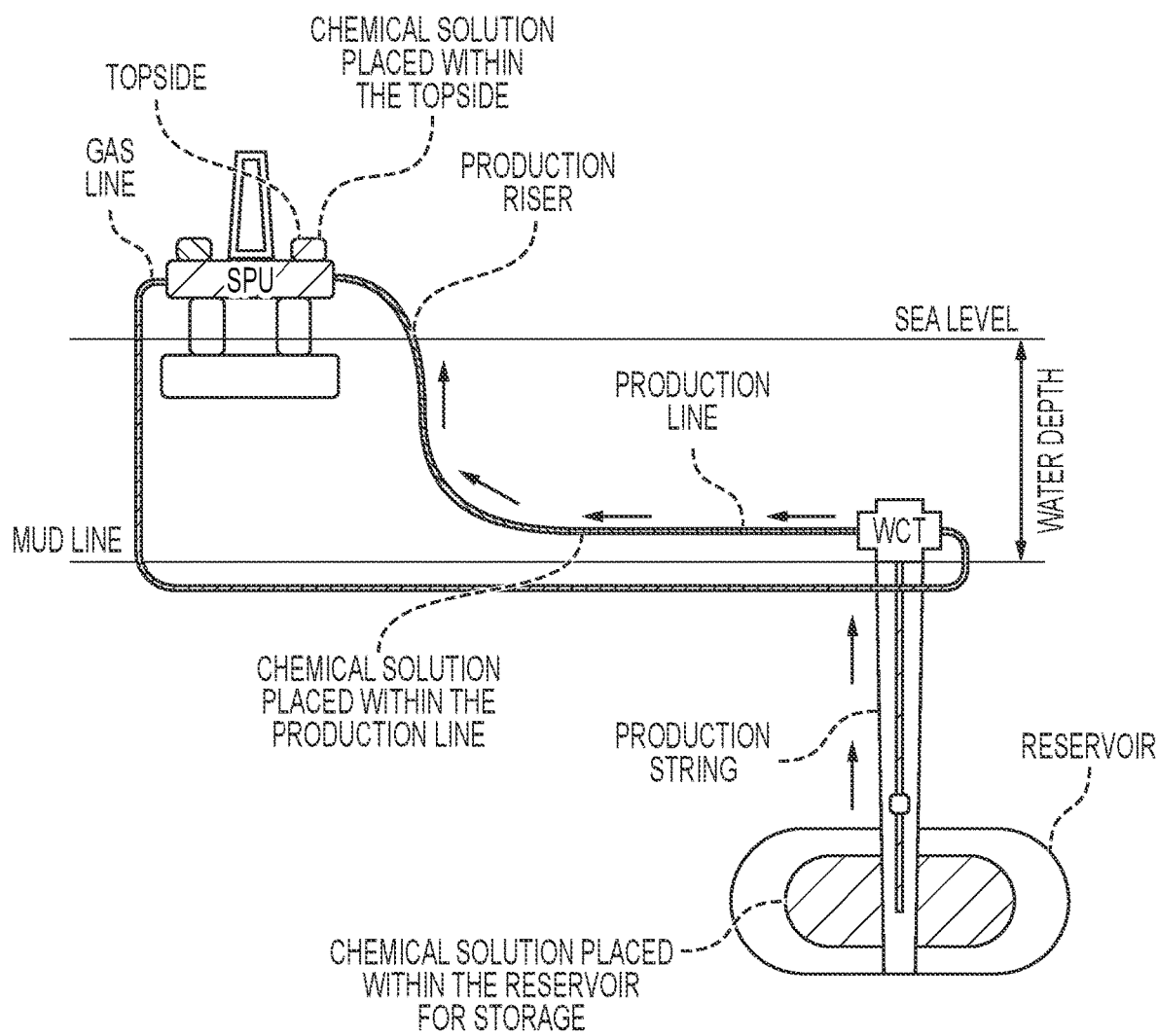
FIG. 5 presents the production of the treatment cushion for topside treatment.

For the production of the treatment cushion for topside treatment (FIG. 5), after equalizing the pressure and temperature of the product in the reservoir conditions, the storage well is aligned to the production and/or injection header being pumped through the surface piping to treat the piping itself and/or topside equipment.

Figure 6:
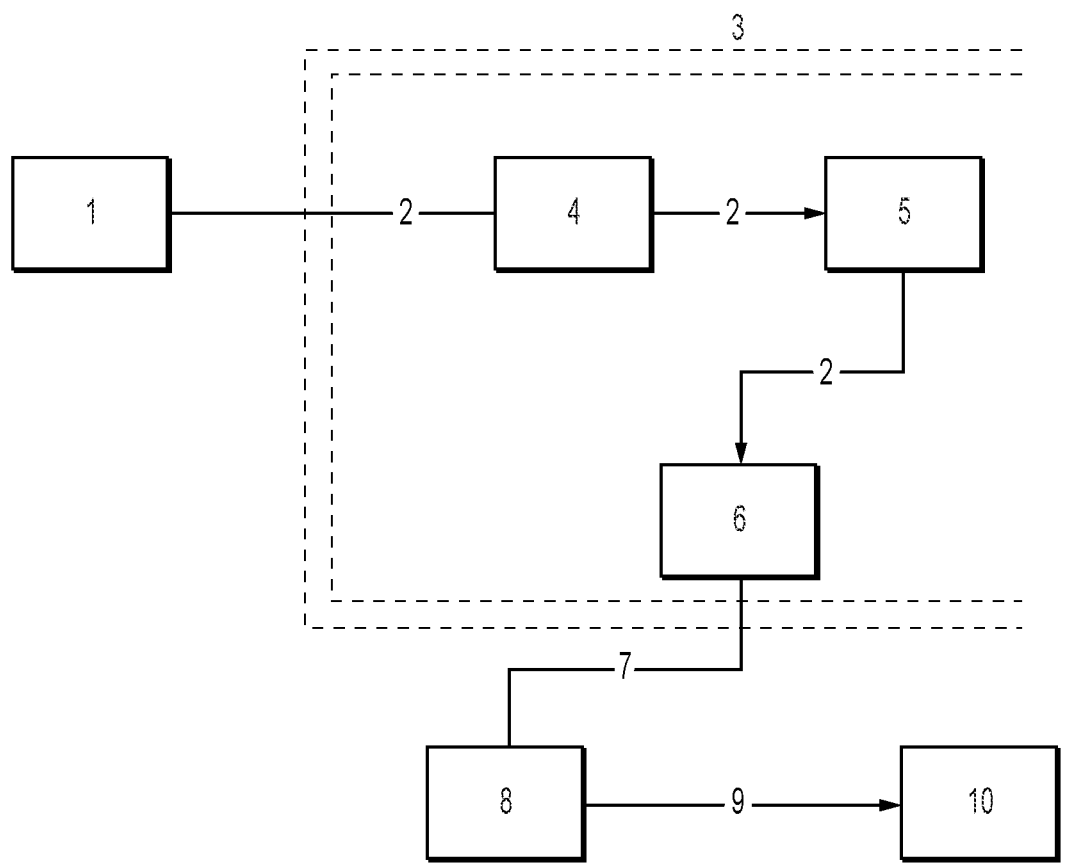
FIG. 6 presents the sequence for placing the chemical product in the reservoir.

Finally, FIG. 6 exemplifies the sequences of placing the chemical product in the reservoir, where (1) represents the cargo boat that takes the chemical product to the location of the SPU (3). Through the transfer line (2), the product will be received by the SPU (3) stored in an appropriate tank or in refills received from the boat. The product is then pumped by the injection skid (5) through the production and/or injection header (4), through the transfer line (2), to the injection head or well adaptation (6), passing through the subsea line (7), and injecting into the target well (8) through the production or injection string (9) and reaching the rock formation (10).

Expected Advantages

Enabling improved Oil recovery technologies by reducing the cost generated by the use of chemical products. The increase in the operational efficiency associated with the use of the invention to increase production helps pay Royalties. Enabling high-volume treatments for flow problems (paraffinization, asphaltenes) and chemical treatment at the TOPSIDE due to the limited capacity of current facilities.

Economic/Productivity

Significant expansion of treatment capacities used in enhanced oil recovery or squeeze of chemical products in rock formations.

Environmental

Reduction in the disposal and need for disposal of chemical tanks. Reduction in the volume of waste discarded into the environment when using injection wells.

Reliability

Remote chemical treatment operations are generally subject to replanning due to availability of cargo space. With storage prior to treatment, this difficulty in terms of storage space can be practically resolved and the treatment carried out while still being able to have the product within specification in the underground storage condition.

Health/Security

With the expansion of treatment capacity, the operator's contact with chemical product tanks during the treatment is reduced. It reduces the possibility of accidents with cargo movement. It reduces the volume of waste discarded when using injection wells.

The invention claimed is:

1. A method for storing chemical products or their solutions in reservoir rock, comprising the steps of:
    (a) assessing a compatibility of the chemical product to be stored with a selected subsea reservoir;
    (b) selecting a product volumetry;
    (c) sending the chemical product to a production or injection header of a stationary production unit (SPU);
    (d) positioning the chemical product in a temporary storage tank present in the SPU;
    (e) pressurizing and sending the chemical product to a wellhead which passes the chemical product to a subsea line for injection into the reservoir;
    (f) penetrating the chemical product into reservoir rock of the reservoir, where it will be stored for later use; and
    (g) removing the chemical product from the reservoir rock and sending the removed chemical product to another wellhead which passes the removed chemical product to another subsea line for injection into another subsea reservoir, where a treatment using the removed chemical product will be carried out.

2. The method according to claim 1, wherein the chemical product comprises a product selected from the group consisting of sulfonates, carboxylic acids and amides, or combinations thereof.

3. The method according to claim 2, wherein the chemical product is selected from the group consisting of pentaphosphonates, phosphinopolycarboxylate, polyvinylsulfonate, sulfonated polyacrylic copolymers, polyacrylates, polyaspartates of α-linkage, polyaspartates of β-linkage, carboxy-methyl-inulin, or combinations thereof.

4. The method according to claim 1, wherein the chemical product is selected from the group consisting of hydrate inhibitor, alcohols, glycols, poly-ethylene glycol, surfactants, silicone- or perfluorosilicone-based anti-foaming agents, or combinations thereof.

5. The method according to claim 1, wherein in step (b), the volumetry of the chemical product is between 500 and 1000 bbl (79.49 and 158.99 m$^3$).

6. The method according to claim 1, wherein in step (c), the chemical product is sent through a transfer line by a cargo vessel.

7. The method according to claim 1, wherein in step (e), the pressurizing and sending are carried out through an injection skid.

8. The method according to claim 7, wherein a pumping pressure of each reservoir is at least 300 psi.

9. The method according to claim 1, wherein in step (f), the penetration of the chemical product is carried out through an injection or production string.

10. The method according to claim 1, wherein the chemical product will be pumped from a container in alignment with a production or injection well and stored in the container in a reservoir condition.

11. The method according to claim 1, wherein each wellhead is located between sea level and a mud line below the sea level.

* * * * *